PERCY WILLIAM GOODFELLOW and
JOHN ANDERSON REAVELL

Nov. 25, 1958    P. W. GOODFELLOW ET AL    2,861,624
SEATS FOR AIRCRAFT CABINS AND OTHER VEHICLES
Filed Dec. 4, 1956    2 Sheets-Sheet 2

PERCY WILLIAM GOODFELLOW and
JOHN ANDERSON REAVELL

BY: Cushman, Darby & Cushman
ATTORNEYS

United States Patent Office 2,861,624
Patented Nov. 25, 1958

2,861,624

SEATS FOR AIRCRAFT CABINS AND OTHER VEHICLES

Percy William Goodfellow, Belfast, Northern Ireland, and John Anderson Reavell, Gravesend, England, assignors to Short Brothers & Harland Limited, Belfast, Northern Ireland, a British company Application December 4, 1956, Serial No. 626,234

Claims priority, application Great Britain December 15, 1955

4 Claims. (Cl. 155—5)

The object of this invention is to provide an improved constructional arrangement of forwardly and rearwardly facing seats for use in the cabins and aircraft and other vehicles, whereby it will be possible, after releasing the seats from their floor attachments, to fold and collapse them into a stowed position against the cabin wall so as to leave the greatest possible floor area for the accommodation of freight or the like. The invention has particular reference to double or multi-seat units, where two or more seats are disposed side by side upon a common frame or chassis, although it is equally applicable to single seats.

The seat frame for the purpose referred to, according to the invention, comprises a chassis carrying the seat-portions and arm-rests, and on which are mounted the back-portions (which may be pivotable) and two leg-members hinged to the chassis about fore-and-aft axes, the inboard leg-member being releasably attachable to the cabin floor or deck and the outboard leg-member being also pivotable above a fore-and-aft axis to an anchorage on the cabin floor or deck, a bolt which is capable of locking the outboard leg-member in the position of use, and means connecting said bolt to the inboard leg-member in such fashion that the bolt may be released by folding said inboard leg-member into a stowed position after detachment from the floor.

The arrangement is such that after the outboard leg-member has been unlocked it may be folded inwardly across the floor and the entire seat lifted about its pivotal attachment to the outboard leg-member until it assumes an upright position against the cabin wall.

The said locking arrangement of the outboard leg-member may be capable of adjustment to vary the angular positions of the leg-members in the locked position, in order that the seat may be used in different aircraft provided with variously spaced and/or located floor attachments for the leg-members.

Figure 6:
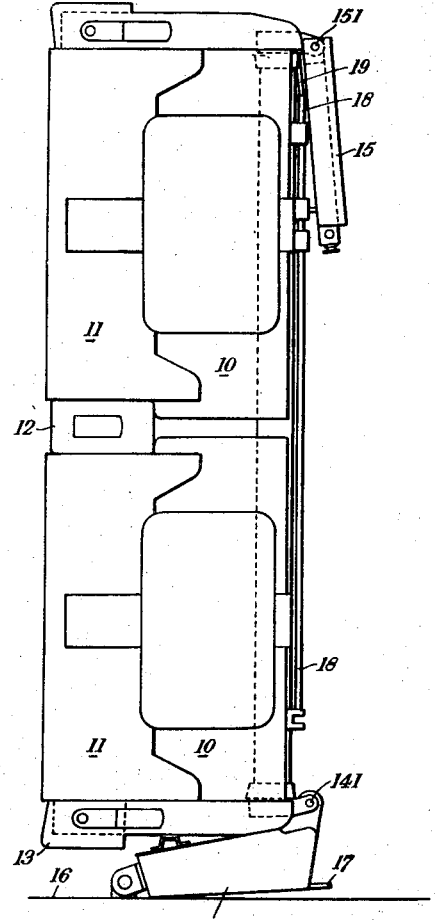
Figure 5:
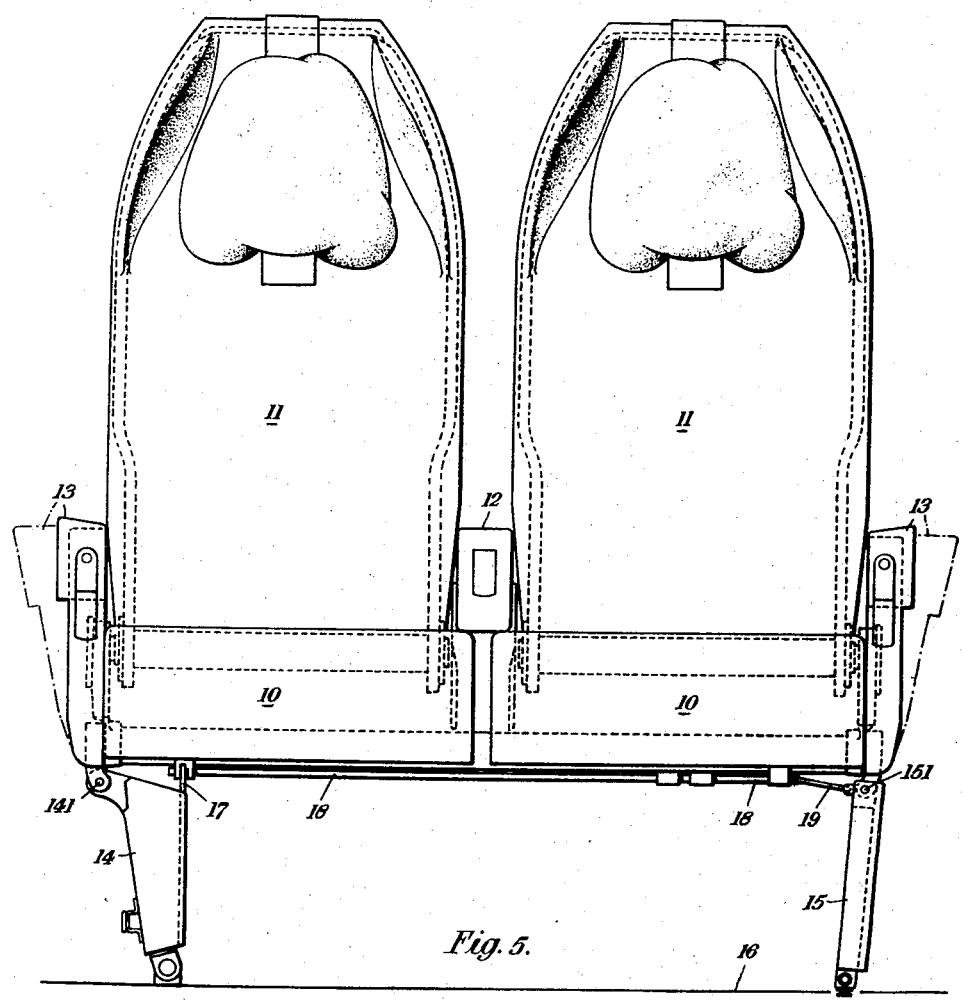
Figure 7:
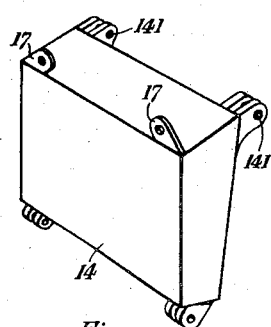

The manner in which the invention is carried into effect is illustrated in, and hereinafter described with reference to the accompanying diagrammatic drawings. In said drawings Figs. 1 to 4 are a series of items depicting the front elevation of a double seat for the cabin of an aeroplane, respectively depicting the different stages of folding the seat assembly and stowing it in a collapsed condition against the cabin wall. Fig. 5 is an elevation of the seat assembly, drawn to a larger scale and showing the folding leg-locking mechanism. Fig. 6 is an elevation of the seat assembly in the stowed position, and Fig. 7 is a perspective detail view of the outboard leg-member of the seat assembly.

The seat shown in the drawings comprises a chassis or frame on which are mounted seat-portions 10, 10 and back portions 11, 11 which are capable of pivotal movement about axes parallel to the rear edges of the seat-portions in such manner that the angle of the back-portions may be adjusted to suit the requirements of the occupants or, when it is desired to collapse the seats for stowage, that the back-portions may be folded into a substantially horizontal position extending forwardly across the seat-portions, as shown in Figs. 2 to 4 and Fig. 7. Spaced arm rests 12 and 13 extend outwardly and forwardly from the sides of the seat 10, the positions to which the outer arm rests 13 may be adjusted being shown in dotted lines in Figure 5.

The outboard and inboard leg-members, respectively indicated by the numerals 14 and 15, are hingedly connected to the underside of the chassis for pivotal movement about longitudinal axes 141 and 151 respectively, so that, when the inboard leg-member 15 has been released from its floor attachment at 16 it is capable of being folded inwardly in relation to the chassis, whilst the outboard leg-member 14 is foldable outwardly. The outboard leg-member 14, which is shown in detail in Fig. 7, is provided with apertured catch-plates 17 which, in the position of use, are aligned with and receive bolts 18 slidably mounted beneath the chassis; said bolts 18 serve to lock the leg-member 14 in the position of use, and they are connected by pivotal links 19 with the inboard leg-member 15, so that the latter may be used to release or engage the bolts 18 by folding it inwardly or unfolding it outwardly respectively about its hinge axis 151.

Figure 1:
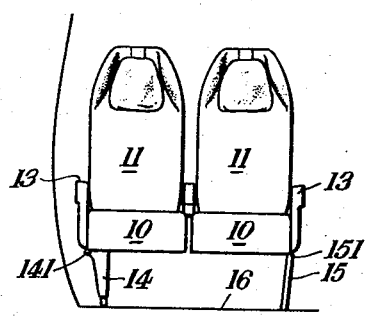
Figure 2:
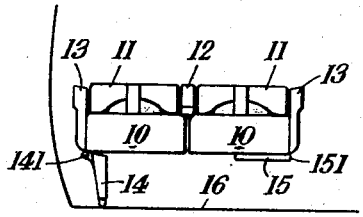
Figure 3:
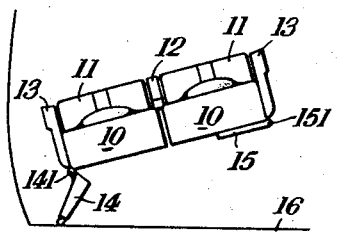
Figure 4:
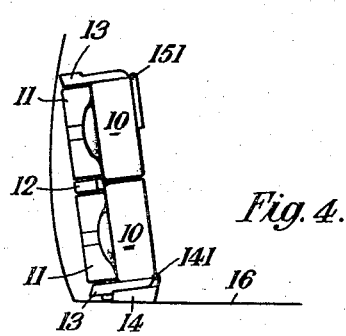

The normal position of use is shown in Fig. 1. If it is desired to stow the seats in order to provide additional space for carrying of freight, the seat backs 11, 11 are pushed forwardly to lie flat across the seat-portions 10, 10, the inboard leg-member 15 is folded inwardly as shown in Fig. 2 to withdraw the bolts 18 from the catch-plates 17 of the outboard leg-member 14. The whole seat unit may then be pulled in an inboard direction as shown in Fig. 3, until the outboard leg-member 14 has pivoted into a position in which it lies across the cabin floor. The seat may then be raised as a whole about the hinge axis 141 of the outboard leg-member 14 until it rests flat against the cabin wall in the position shown in Fig. 4, in which position it may be secured until required again for the accommodation of passengers. The inboard leg-member 15, if preferred, may be suitably shaped to fold outwardly to lie along the side of the seat instead of folding underenath.

It is found that the location and interspacing of the seat leg attachments to the floor vary in aircraft of different manufacturers. In order that the seats provided by this invention may be capable of installation in a wide range of aircraft having differing floor attachment arrangements, the aforesaid catch-plates 17 by which the outboard leg-members 14 are locked in the position of use may be made to suit different angular positions of the leg-members 14, 15, according to the interspacing of the floor attachments, the desired gangway width and the positions of such attachments in relation to the longitudinal axis of the aircraft.

What we claim as our invention and desire to secure by Letters Patent is:

1. A foldable seat assembly movable from a horizontal operative position to a vertical inoperative position, said assembly including a chassis having at least one seat, an inboard leg pivotally connected to the chassis, an outboard leg longitudinally spaced from the inboard leg, said outboard leg having an upper end and a lower end, means pivotally connecting said upper end to said chassis, said legs normally extending downwardly from the chassis to engage the floor so as to support the seat in its horizontal position, means pivotally connecting the lower end of said outboard leg to the floor, locking means releasably engageable with said outboard leg for maintaining the same in a vertical position when the inboard leg engages the floor, and means operatively connecting the locking means to said inboard leg so that, when the outboard leg is in its normal position and the inward leg is swung downwardly to engage the floor, said inboard leg moves the locking means in engagement with the outboard leg and, when the inboard leg is moved upwardly away from the ground, the locking means is released from engagement with the outboard leg.

2. A foldable seat assembly movable from a horizontal operative position to a vertical inoperative position, said assembly including a chassis having at least one seat, an inboard leg pivotally connected to the chassis, an outboard leg longitudinally spaced from the inboard leg, said outboard leg having an upper end and a lower end, means pivotally connecting said upper end to said chassis, said legs normally extending downwardly from the chassis to engage the floor so as to support the seat in its horizontal position, means pivotally connecting the lower end of said outboard leg to the floor, said outboard leg having a catch plate provided with an opening, bolt means slidably mounted under the chassis and arranged releasably to extend through said opening when the outboard legs is in its normal position and said seat assembly is in its operative position, and means operatively connecting the bolt means to said inboard leg for controlling the engagement of the bolt means with the catch plate upon movement of the inboard leg about its pivot.

3. A foldable seat assembly movable from a horizontal operative position to a vertical inoperative position, said assembly including a chassis having at least one seat, an inboard leg pivotally connected to the chassis, an outboard leg longitudinally spaced from the inboard leg, said outboard leg having an upper end and a lower end, means pivotally connecting said upper end to said chassis, said legs normally extending downwardly from the chassis to engage the floor so as to support the seat in its horizontal position, means pivotally connecting the lower end of said outboard leg to the floor, said outboard leg having spaced catch plates having openings, a pair of bolts slidably mounted beneath the chassis and having end portions insertable through said openings for locking the bolts to the outboard leg when the latter is moved to its normal position and said seat assembly is in its operative position, and means operatively connecting the bolts to said inboard leg so that, when the assembly is moved to its operative position and the inboard leg is swung downwardly to engage the floor, the locking bolts are moved into the openings in the catch plates so as to maintain the outboard leg in a fixed position, and when the inboard leg is swung upwardly away from the floor, the locking bolts are released from engagement with the outboard leg.

4. A foldable seat assembly movable from a horizontal position to a vertical inoperative position, said assembly including a chassis having at least one seat, a back hinged to said chassis and arranged to be folded so as to overlap the seat, an inboard leg pivotally connected to the chassis and having means arranged to releasably engage the floor, an outboard leg longitudinally spaced from the inboard leg, said outboard leg having an upper end and a lower end, means pivotally connecting said upper end to said chassis, said legs normally extending downwardly from the chassis to engage the floor and support the seat in its horizontal position, means pivotally connecting the lower end of said outboard leg to the floor, locking means releasably engageable with said outboard leg for maintaining the same in a vertical position when the inboard leg engages the floor, and means operatively connecting the locking means to said inboard leg so that, when the assembly is in its horizontal position, the inboard leg is swung downwardly to engage the floor and the locking means is moved by the inboard leg into locking engagement with the outboard leg to maintain the same in a fixed position, said locking means being released from engagement with the outboard leg when the inboard leg is swung upwardly away from engagement with the floor after which said assembly may be moved to its vertical position, said outboard leg as the seat is moved to its vertical position being swung downwardly into engagement with the floor so as to engage the adjacent end of the seat.

References Cited in the file of this patent

UNITED STATES PATENTS

| 562,269 | Auerbach | June 16, 1896 |
| 644,635 | Plunkett | Mar. 6, 1900 |
| 741,446 | Benz | Oct. 13, 1903 |
| 2,307,920 | Deschamps | Jan. 12, 1943 |
| 2,674,300 | Liljengren et al. | Apr. 6, 1954 |